Dec. 24, 1968   C. J. BURKE ET AL   3,417,457

WELDING METHOD AND APPARATUS

Filed Aug. 30, 1962

INVENTORS:
CLARENCE J. BURKE,
KENNETH J. MILLER,
BY

Attorney.

United States Patent Office 3,417,457
Patented Dec. 24, 1968

3,417,457
WELDING METHOD AND APPARATUS
Clarence J. Burke, Palos Verdes Estates, and Kenneth J. Miller, Fullerton, Calif., assignors, by mesne assignments, to Caterpillar Tractor Co., Peoria, Ill., a corporation of California
Filed Aug. 30, 1962, Ser. No. 220,417
14 Claims. (Cl. 29—470.3)

This invention relates generally to the art of joining metals and other materials and particularly to an improved method of welding and to apparatus for practicing the method.

Generally speaking all known methods of welding utilize the same basic physical phenomenon to create a weld, namely, diffusion of the metals being joined with one another or with an intervening welding metal or transition alloy. These known welding methods may be classified into three categories according to the type of diffusion which occurs in each method, to wit:

(1) Fusion welding which involves molten state diffusion,
(2) Forge welding which involves plastic or semisolid state diffusion, and
(3) Impact or percussive welding which involves extremely localized interface fusion.

One existing welding method which is particularly useful in certain welding applications, such as joining shafts to one another or a shaft to a plate or disc, is friction welding. Friction welding as it is presently practiced is a fusion welding process involving molten state welding diffusion of the metals being joined. Thus according to the existing friction welding practice, the parts being joined are driven in relative rotation with abutting interfaces thereof in pressured contact until these interfaces are frictionally heated to the molten state. Relative rotation of the parts is then terminated and the diffused, molten interfaces are allowed to cool, thereby producing a weld between the parts. The weld thus produced has the advantages of strength, exceeding in many cases the strength of the parts themselves, neat appearance, and absence of an external weld bead. This latter advantage is due to the fact that the weld is confined to the zone between the interfaces and eliminates, in many cases, the need for machining, except for trimming of any "flash" created by extrusion of molten metal from between the contacting interfaces. The friction welding method itself is advantageous owing to the relative simplicity of the machinery required to practice the method and to the fact that the welding heat is generated precisely where it is required for welding, that is, between the abutting interfaces of the parts.

The existing friction welding practice does, however, possess three distinct disadvantages. Perhaps the most serious disadvantage is that the elevated temperature to which the interfaces must be heated to effect a weld creates heat affected zones in the immediate vicinity of the weld. During cooling of the weld, large grain growth occurs in these zones resulting in appreciable weakening of the parts in the immediate vicinity of the weld.

The second disadvantage of the existing friction welding practice resides in the high energy input and massive equipment necessary to rotate the parts being joined in sufficient frictional contact to frictionally generate the requisite high welding temperature as well as in the relatively long duration of the welding cycle.

The third disadvantage of the existing practice is that friction clutches or other complex means are required to terminate relative rotation of the parts when welding diffusion is accomplished to permit the formation of a bond between the parts. This is due, in part, to the fact that the momentum of the relatively large and powerful rotary motors required is so high as to prohibit termination of relative rotation of the parts simply by allowing the motors to stall or otherwise abruptly stopping the same.

While the plastic state impact diffusion occurring in forge welding and the impact diffusion occurring in straight percussive or impact welding inherently avoid the above deficiencies of the molten state diffusion, forge welding, as is presently practiced, is not as convenient as friction welding nor can it be employed in many of the welding applications to which friction welding is so ideally adapted. The same applies to straight impact welding which requires impact forces of such great magnitude as to prohibit use of this method in all but very special applications. As far as we are aware, no one has developed a welding method involving the elements and having the advantages of both the friction welding method and the forge or impact methods.

A general object of the present invention is to provide an improved method of and machines for practicing welding which avoid the above noted deficiencies of the conventional methods of welding and possess the advantages of both friction and forge welding.

A more specific object of the invention is to provide an improved welding method and machine of the character described in which the abutting interfaces of the parts to be joined are frictionally heated to the proper welding temperature and welding diffusion of these heated interfaces is caused to occur by impact, whereby a metallurgical bond is created between the parts.

A further object of the invention is to provide an improved welding method and machine of the character described which are relatively simple, economical, and otherwise ideally suited to their intended purposes.

Briefly, the objects of the invention are attained by providing a welding method and welding machines wherein the parts to be joined are frictionally heated to the proper welding temperature by driving them in relative rotation with interfaces thereof in contact. In the preferred practice of the invention, the welding temperature is that at which the interfaces are heated to the plastic state. Welding diffusion of the heated interfaces is effected by an impact. Thus, the invention provides, in effect, an improved method of forge welding in which the parts to be joined are heated to welding temperature by frictional heat rather than by a separate heat source as in the conventional forge welding methods. The parts are driven in rotation by low-inertia motors, such as air turbines, which stall when welding diffusion occurs, thereby eliminating the need for friction clutches or other complex mechanism to terminate relative rotation of the parts.

According to the preferred practice of the invention, the parts to be joined are driven up to a predetermined relative angular velocity, in counter directions of rotation, and are then driven into impact to effect frictional heating of their abutting interfaces. In this way, the heat generated by the impact aids heating of the interfaces by rubbing friction and the angular momentum of the rotating machinery and parts contributes to the energy required to effect such frictional heating. After the interfaces have been thus elevated to the proper welding temperature at which the abutting interfaces are heated to the plastic state, the interfaces are driven together with an impact to effect forge welding thereof to one another. This latter impact is accomplished either by separating the parts and immediately driving them together with an impact or by leaving the frictionally heated interfaces of the parts in contact and producing a blow on the parts to create the welding impact. In some cases, where the parts are driven at a high relative angular velocity, frictional heating of the interfaces to the proper welding temperature and welding diffusion of the interfaces may occur substantially simultaneously with the initial impact of the parts. In other cases, a separate transition alloy may be placed between the abutting interfaces to be joined to effect welding thereof.

The added resistance imposed on the rotary driving motors when welding diffusion occurs at the interfaces, causes the motors to stall. Upon the advent of stall, the motors are de-energized to remove the small remanent torque stress on the parts and thus assure the integrity of the metallurgical bond between them.

The invention will be better understood from the following detailed description taken in connection with the attached drawings wherein.

Figure 1:
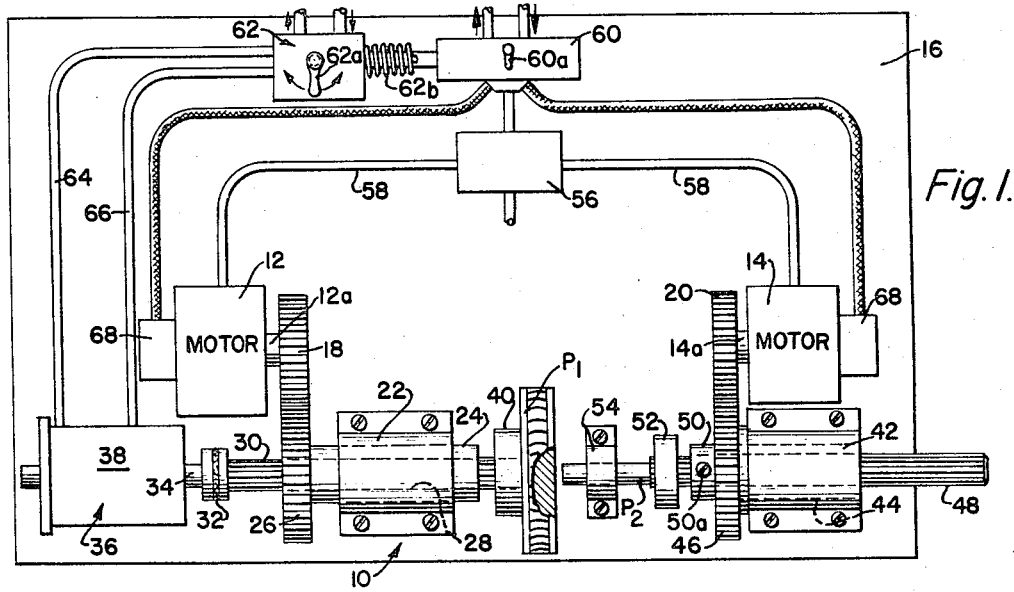
FIG. 1 illustrates one form of welding machine according to the present invention.

Referring now to FIG. 1 of these drawings, there is illustrated a friction welding machine 10 comprising two rotary motors 12 and 14 mounted on a rigid frame 16. For reasons to be explained shortly, motors 12 and 14 are preferably air turbines. Insofar as the broad concept of the invention is concerned, however, the motors may be of any kind which fulfill the operational requirements and possess the stall characteristics hereinafter discussed. A gear 18 is fixed to the shaft 12a of motor 12. A gear 20 is fixed to the shaft 14a of motor 14.

Mounted on the frame 16 adjacent the motor 12 is a bearing 22. The axis of bearing 22 is disposed in parallel, laterally offset relation to the axis of the motor 12. A sleeve 24, having a gear 26 rigid on one end thereof, is rotatably supported but restrained against axial movement in the bearing 22. Gear 26 meshes with gear 18 whereby sleeve 24 is driven in rotation by motor 12.

The central opening 28 through sleeve 24 and gear 26 is internally splined. Extending slidably through this splined opening is an externally splined shaft 30 which rotates with the sleeve. Connected by a rotary coupling 32 to the left hand end of shaft 30 is the piston rod 34 of a double acting hydraulic linear actuator 36. The cylinder 38 of the actuator is attached to the frame 16. As will be seen shortly, during operation of the welding machine 10, the actuator 36 is utilized to drive the shaft 30 axially.

Carried on the right hand of shaft 30 is a work holder 40 for one part $P_1$ to be welded. Part $P_1$ has been illustrated as comprising a turbine rotor which is positioned, by holder 40, coaxially with the shaft 30.

Mounted on the frame 16 adjacent the motor 14 is a bearing 42 coaxial with bearing 22. A sleeve 44, having a gear 46 rigid on one end thereof, is rotatably mounted but restrained against axial movement in the bearing 42. Gear 46 meshes with gear 20 so that sleeve 44 is driven in rotation by motor 14.

The central opening through sleeve 44 and its gear 46 is splined. Extending slidably through this splined opening is an externally splined shaft 48. Shaft 48 rotates with sleeve 44. During operation of the machine, the shaft 48 is locked against axial movement in the sleeve 44. At other times, however, it may be desirable to axially adjust the shaft 48 in the sleeve 44. These ends can be accomplished in various ways, such as by providing the shaft 48 with an adjustable thrust collar 50 fixed to the shaft by lock screws 50a capable of withstanding the impact discussed below.

Rigid on the end of shaft 48 proximate to shaft 30 is a work holder 52 for the second part $P_2$ to be welded to the part $P_1$. Part $P_2$ illustrated comprises a shaft to be welded to the turbine wheel $P_1$. As mentioned earlier, many different kinds of parts can be welded by the present machine so that the latter should not be regarded as limited in application to the welding of shafts to turbine wheels or other disc-shaped parts as disclosed herein for illustrative purposes. For this reason, the work holders 40 and 52 may be removable from their shafts 30 and 48 to permit them to be replaced by work holders suitable for the particular parts to be welded.

Part $P_2$ is positioned, by holder 52, on the common rotation axis of the shafts 30, 48. If desirable or necessary, such as where part $P_2$ is a shaft as shown, a bearing support 54 on the frame 16 may be provided for the part.

As noted earlier, motors 12 and 14 are preferably, though not necessarily, air turbines and for this reason will be assumed to be air turbines in the remainder of the description. That other kinds of motors may be used will be obvious from the description. The shafts of the motors turn in the same direction relative to their respective motor housings. Accordingly, the motors drive the shafts 30 and 48, and the parts $P_1$, $P_2$, in opposite directions of rotation.

Operating air under pressure, from a suitable source (not shown), is supplied to the turbines 12 and 14 through a solenoid valve or other power operated valve 56 and fluid lines 58. Valve 56 is operated by a control system 60 which is designed to perform the sequential control functions described below. Hydraulic fluid from a suitable source (not shown) is supplied to and vented from the ends of the hydraulic actuator cylinder 38 through a two position, solenoid or other power actuated control valve 62 and fluid conduits 64 and 66. In the first position of valve 62, the hydraulic actuator 36 moves the shaft 30 to the left in the drawing. In the second position of valve 62, the hydraulic actuator 36 moves the shaft 30 to the right. Valve 62 has a handle 62a by which the valve can be set in its first position to effect movement of the shaft 30 to the left. The valve is connected to the control system 60 and is shifted to its second position by operation of this system to effect movement of the shaft 30 to the right.

As will be seen shortly, control system 60 operates the valves 56 and 62 in response to the rotary speed of the motors 12 and 14 to this end, the control system is connected to speed sensors 68 on the motors.

The illustrated friction welding machine operates as follows:

Handle 62a of valve 62 is manually operated to effect movement of the shaft 30 and work holder 40 thereon to their extreme left hand position. The parts $P_1$ and $P_2$ to be welded to one another are then mounted in the holders. As mentioned earlier, part $P_1$ has been illustrated as being a turbine rotor to be welded to the part or shaft $P_2$. As described below, the shaft 30 is subsequently shifted to the right to bring the part $P_1$ into contact with the part $P_2$. Accordingly, after the parts have been mounted in the twork holders 40, 52, it is necessary to axially locate the work holder 52, by loosening the lock screws 50a which axially restrain the shaft 48 of the latter holder in its sleeve 44, in the correct position for proper contact of the parts $P_1$ and $P_2$ during operation of the machine. After this adjustment of the work holder has been completed, the lock screws 50a are reset to lock the holder in its adjusted position.

The motors 12 and 14 are started by actuating a suitable control 60a in the control system 60 which effects opening of the valve 56 to admit operating air to the motors, as described below. The motors then commence driving the shafts 30, 48 and parts $P_1$, $P_2$ thereon in opposite directions of rotation on a common axis. The control system 60 is designed to be responsive to the rotary speed of the motors, as sensed by the speed sensors 68 on the motors, in such manner that control system operates the valve 62, to cause the hydraulic actuator 36 to drive the rotating shaft 30 to the right, in response to the motors attaining a predetermined angular velocity of the counter rotating parts $P_1$, $P_2$. In typical applications of the invention, this relative angular velocity of the parts at which the control system 60 operates the valve 62 to effect movement of the shaft 30 to the right will be in the range of 14,000 r.p.m. to 74,000 r.p.m. depending on the particular materials or metals to be joined.

Movement of the shaft 30 to the right drives the rotating part $P_1$ into impact with the oppositely rotating part $P_2$. This abrupt impact of the two counter rotating parts produces some heating of the contacting interfaces thereof and the subsequent relative rotation of the parts produces additional frictional heating of the interfaces.

When the interfaces are thus heated to welding temperature, preferably the plastic state, the temperature of which will vary, of course, with the metals being joined, the part $P_1$ is retracted out of contact with part $P_2$ and is then immediately driven again into impact with part $P_2$ by shifting the valve handle 62a to the left and then releasing the handle in the manner described below. This latter impact of the frictionally heated parts produces welding diffusion of their interfaces and, thereby, a metallurgical bond between the interfaces. The bond thus created between the parts creates a strong braking torque on the motors 12 and 14. According to the invention the motors are so designed, and the pressure of the operating air admitted to the motors is so adjusted, that the motors stall when this braking torque attains a predetermined magnitude corresponding to an optimum metallurgical bond between the parts $P_1$, $P_2$.

The control system 60, which senses stalling of the motors through the action of the speed sensors 68 is designed to respond to such stalling by reclosing the motor control valve 56. The supply of operating air to the motor is thus cut off.

Figure 2:
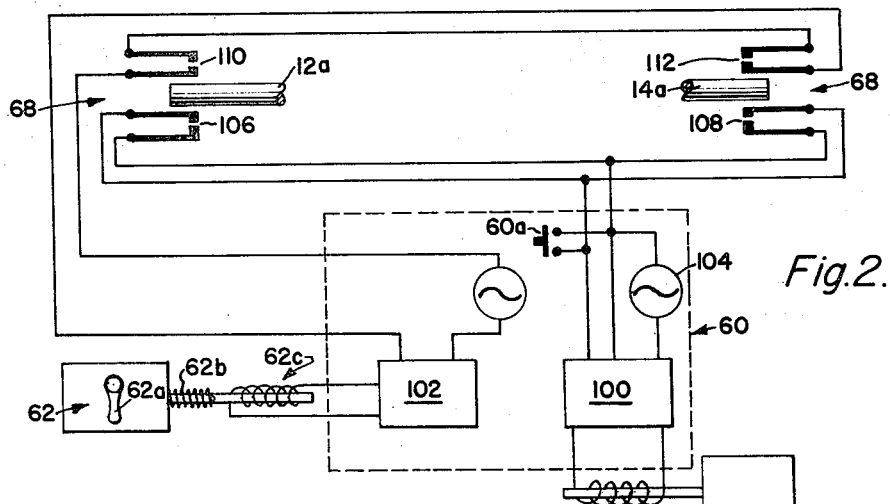
FIG. 2 is a schematic illustration of the control system of the welding machine in FIG. 1.

Reference is now made to FIG. 2 which diagrammatically illustrates one manner in which the above sequential operations of the welding machine can be accomplished. In this figure, the control system 60 comprises a relay 100 for operating the motor control valve 56 between its open and closed positions and a relay 102 for operating the hydraulic actuator control valve 62 to the position in which the actuator 36 drives the shaft 30 to the right in FIG. 1. The valve 62 is manually operated to its other position by the valve handle 62a.

Relay 100 is energized, to shift the valve 56 to its open position, from a power source 104 through two normally open, centrifugally closed switches 106 and 108 on the shafts 12a and 14a of motors 12 and 14, respectively. These switches comprise part of the motor speed sensors 68 and are connected in parallel so that closure of either switch will energize the relay 100. Switch 60a is connected in shunt with the switches 106 and 108. These latter switches are responsive to the speed of motors 12 and 14 in such manner that they remain closed so long as the motor speeds are above a predetermined stalling speed and open in response to the motor speed dropping to this stalling speed.

When motor switch 60a is closed to start the machine, as described earlier, the then open centrifugal switches 106 and 108 are shorted out and the relay 100 is energized to open valve 56 and thereby supply operating air to the motors 12 and 14. When either of the motors has attained a sufficient speed to close its switch 106 or 108, motor switch 60a may be released. As the motors accelerate to a higher predetermined speed at which welding is to be accomplished, switches 110 and 112 close the circuit to relay 102. This relay, in turn, energizes the solenoid coil 62c which unlatches the valve 62 which in then returned, under the influence of its spring 62b, to its original position in which the part $P_1$ is again driven to the right into impact with part $P_2$ to produce plastic state welding diffusion of the heated interfaces and thereby a metallurgical bond between the parts, as described earlier.

When, upon completion of the metallurgical bond between the parts $P_1$, $P_2$, the speeds of both motors drop to the predetermined stalling speed for which the switches 106 and 108 are set, the latter switches open, thereby de-energizing the relay 100 for the motor control valve 56 and permitting the latter to close under the action of a spring (not shown) therein. The supply of operating air to the motors is then cut off after which the welded parts are removed from their holders 40 and 52 and the holder 40 is retracted by manual operation of the valve handle 62a in the manner described above. Other control systems for the machine may, of course, be devised.

From the foregoing description, it is evident that the preferred practice of the present welding method involves driving the parts to be joined in counter directions of rotation, then moving them axially into impact after they have attained a predetermined relative angular velocity to effect heating of the interfaces of the parts to the plastic state, and finally creating an impact between the heating interfaces to produce plastic or semi-solid state diffusion of the interfaces and a metallurgical bond therebetween.

As noted earlier in some cases the relative angular velocity of the parts at the time of their initial impact and the force of this initial impact may be such that the impact and frictional heating of the parts which occurs substantially simultaneously with the initial impact will be sufficient to create a metallurgical bond between the parts. In other cases, where dissimilar metals are joined, it may be necessary to use a transition or transport welding alloy between the abutting interfaces of the metals. Should such an alloy be required, it may be applied to one or both of the interfaces to be joined. In the appended claims, the expression "interfaces" is intended to encompass both bare surfaces of the parts to be joined which are placed in direct contact during welding and surfaces of the parts to which a transition alloy has been applied when required for welding.

Figure 3:
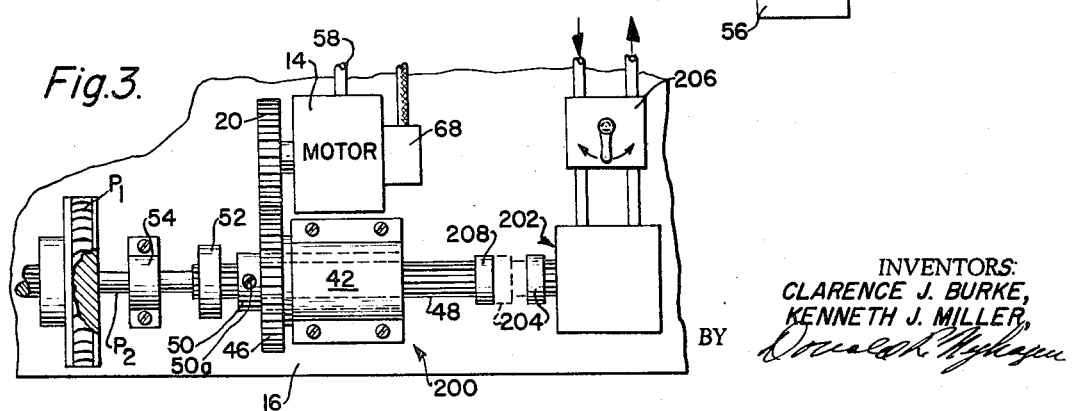
FIG. 3 illustrates a modified welding machine according to the invention.

Reference is now made to FIG. 3 illustrating a modified welding machine 200 according to the invention. Welding machine 200 is identical to welding machine 20 described above except that machine 200 is equipped with an additional impact device 202. This impact device may be of any conventional design including a ram 204 and controls 206 for driving the ram to the left in FIG. 3 and retracting the ram to its normal position in that figure. The impact device 202 is mounted on the machine frame 16 in alignment with the shaft 48. Shaft 48 carries an anvil 208 to be struck by the ram 204.

In operation of this modified welding machine 200, the parts $P_1$ and $P_2$ to be welded are driven up to speed and then brought into initial impact, exactly the same as described in connection with the welding machine 10, to heat the abutting interfaces of the parts to the plastic state. The ram 204 of the impact device 202 is then driven into impact with the anvil 208 in the rotating shaft 48. This impact is transmitted through the shaft 48 to part $P_2$ which is thereby driven against part $P_1$ with an impact to produce a metallurgical bond between the parts as before. When this bond is completed, the drive motors of the welding machine stall and are stopped in the manner described earlier. It is obvious that the welding method utilized in the welding machine 200 is essentially the same as that utilized in the welding machine 10 and described above.

The invention herein described and illustrated is, therefore, fully capable of attaining the objects and advantages previously set forth.

While certain personally preferred embodiments and practices of the invention have been disclosed for illustrative purposes, numerous modifications in the design, arrangement of parts, instrumentalities and practices of invention may be made without departing from its spirit and scope.

We claim:
1. The method of welding parts together which comprises the steps of:
   producing relative rotation of said parts by driving at least one part in rotation;
   effecting relative axial movement of said parts into forging impact during relative rotation thereof to heat the abutting interfaces of the parts to welding temperature by dissipation of the forging impact and frictional energies at said interfaces, and creating forced contact of said interfaces while at said temperature to cause welding diffusion to occur at said interfaces; and terminating relative rotation of said parts after heating of said interfaces to said temperature.

2. The method of welding parts together which comprises the steps of:

driving said parts in opposite directions of rotation;

effecting relative axial movement of said parts into forging impact to produce heating of the abutting interfaces thereof to the plastic state by dissipation of the forging impact and frictional energies at said interfaces, and creating forced contact of said interfaces while in said plastic state to cause welding diffusion to occur at the interfaces; and terminating relative rotation of said parts upon the occurrence of said welding diffusion.

3. The method of welding parts together which comprises the steps of:

effecting relative rotation of said parts by driving at least one part in rotation with interfaces of the parts in frictional contact, whereby to effect frictional heating of said interfaces, to welding temperature;

producing forging impact of said interfaces while the latter are at said temperature to cause welding diffusion to occur at said interfaces; and terminating relative rotation of said parts after heating of the latter to said temperature.

4. The method of welding parts together which comprises the steps of:

driving the parts in opposite directions of rotation with interfaces thereof in frictional contact to effect frictional heating of said interfaces to the plastic state;

producing forging impact of said interfaces while the latter are in said state to cause welding diffusion to occur at said interfaces; and terminating relative rotation of said parts after frictional heating of said interfaces to said state.

5. The method of welding parts together which comprises the steps of:

effecting relative rotation of said parts to a predetermined relative angular velocity by driving at least one part in rotation;

effecting relative axial movement of said parts into impact while at said relative angular velocity to effect heating of the abutting interfaces of the parts to welding temperature by dissipation of the impact and frictional energies at said interfaces;

producing forging impact of said interfaces while the latter are at said temperature to cause welding diffusion to occur at said interfaces; and terminating relative rotation of said parts after heating of said interfaces to said temperature.

6. The method of welding parts together which comprise the steps of:

driving said parts in opposite directions of rotation on a common axis to a predetermined relative angular velocity;

effecting relative axial movement of said parts into impact while at said relative angular velocity to effect heating of the abutting interfaces of the parts to the plastic state by dissipation of the impact and frictional energies at said interfaces;

producing forging impact of said interfaces while the latter are in said plastic state to cause welding diffusion to occur at said interfaces; and terminating relative rotation of said parts when said welding diffusion occurs.

7. The method of welding parts together which comprises the steps of:

effecting relative rotation of said parts by driving at least one part in rotation with interfaces of the parts in frictional contact, whereby to effect frictional heating of said interfaces, to welding temperature;

effecting relative axial movement of said parts to disengage said interfaces and then re-engage said interfaces with a forging impact while said interfaces are at said temperature to cause welding diffusion to occur at said interfaces; and terminating relative rotation of said parts after heating of said interfaces to said temperature.

8. The method of welding parts together which comprises the steps of:

effecting relative rotation of said parts by driving at least one part in rotation with interfaces of the parts in frictional contact, whereby to effect frictional heating of said interfaces to welding temperature;

producing a blow on one of said parts to create a forging impact of said interfaces while the latter are at said temperature whereby to cause welding diffusion to occur at said interfaces; and terminating relative rotation of said parts after heating of said interfaces to said temperature.

9. The method of welding parts together which comprises the steps of:

driving said parts in opposite directions of rotation on a common axis to a predetermined relative angular velocity;

effecting relative axial movement of said parts into impact while at said relative angular velocity to produce heating of the abutting interfaces of said parts to the plastic state by dissipation of the impact and frictional energies at said interfaces;

effecting relative axial movement of said parts while said interfaces are in said state to disengage the interfaces and then re-engage the interfaces with a forging impact to cause welding diffusion to occur at the interfaces; and terminating relative rotation of said parts when said welding diffusion occurs.

10. The method of welding parts together which comprises the steps of:

driving said parts in opposite directions of rotation on a common axis to a predetermined relative angular velocity;

effecting relative axial movement of said parts into impact while at said relative angular velocity to produce heating of the abutting interfaces of said parts to the plastic state by dissipation of the impact and frictional energies at said interfaces;

producing an axial blow on one of said parts to create a forging impact between said interfaces while the latter are in said state to cause welding diffusion to occur at said interfaces; and terminating relative rotation of said parts when said welding diffusion occurs.

11. A machine for welding parts together comprising:

coaxial holders for said parts;

rotary driving means for effecting relative rotation of said holders; and means for causing relative axial movement of said holders together to bring said parts into percussive impact so as to impart a substantial amount of axially-directed impact energy to the impacting surfaces of said parts.

12. A machine for welding parts together comprising:

coaxial holders for said parts;

rotary driving means for effecting relative rotation of said holders;

means for causing relative axial movement of said holders together to bring said parts into contact whereby to effect frictional heating of the abutting interfaces of the parts to welding temperature; and means for causing a forging impact of said interfaces while the latter are heated to said temperature to cause welding diffusion of said interfaces.

13. The subject matter of claim 12 wherein:
said last mentioned means comprises means for effecting relative axial movement of said holders apart and subsequent relative axial movement of said holders together to bring said interfaces into forging impact after the interfaces have been heated to said temperature.

14. The subject matter of claim 12 wherein:
said last mentioned means comprises an impact device for producing a blow on one holder to drive said interfaces together with a forging impact after the interfaces have been heated to said temperature.

References Cited

UNITED STATES PATENTS

| | | | |
|---|---|---|---|
| 1,352,646 | 9/1920 | Baltzley | 77—33.5 |
| 3,120,138 | 2/1964 | Ronay | 29—497.5 X |
| 3,134,278 | 5/1964 | Hollander et al. | 228—2 |
| 3,273,233 | 9/1966 | Oberle et al. | 29—470.3 |

FOREIGN PATENTS

| | | |
|---|---|---|
| 572,789 | 10/1945 | Great Britain. |
| 1,265,578 | 5/1961 | France. |

OTHER REFERENCES

Friction Welding of Metals by Vill, Published in Russia, June 25, 1959. Translation from Russian published by American Welding Society, Inc. New York, N.Y. pp. 1 and 63–88.

RICHARD H. EANES, JR., *Primary Examiner.*

U.S. Cl. X.R.

28—2, 24